United States Patent [19]

Montalvo et al.

[11] Patent Number: 5,306,115
[45] Date of Patent: Apr. 26, 1994

[54] RECIPROCATING MEMBER FOR DISPENSING FLAT ARTICLES

[75] Inventors: Samuel A. Montalvo, San Jose; Phillip J. Kronzer, Los Gatos, both of Calif.

[73] Assignee: Creative Disc Products, Inc., Campbell, Calif.

[21] Appl. No.: 950,808

[22] Filed: Sep. 23, 1992

[51] Int. Cl.$^5$ .............................................. G65H 3/24
[52] U.S. Cl. ................. 414/797.9; 414/798.1; 414/788.7; 414/789.6
[58] Field of Search ............... 414/796.6, 797.6, 797.7, 414/797.1, 797.9, 798.1; 360/99.03

[56] References Cited

U.S. PATENT DOCUMENTS

| | | | |
|---|---|---|---|
| 2,117,906 | 5/1938 | Obermiller | 414/791 |
| 3,294,259 | 12/1966 | Puhm | 414/798.1 |
| 3,682,473 | 8/1972 | Kuyt | 414/907 |
| 4,019,452 | 4/1977 | Rouse | 414/797.7 |
| 4,396,336 | 8/1983 | Malamood | 414/797.9 |
| 4,571,645 | 2/1986 | Johnson et al. | 360/98 |
| 4,665,455 | 5/1987 | Mesher | 414/332 |
| 4,693,659 | 9/1987 | Burke et al. | 414/753 |
| 4,720,230 | 1/1988 | Johnson et al. | 414/797.9 |
| 4,813,838 | 3/1989 | Santeusanio | 414/798.1 |
| 4,910,675 | 3/1990 | Burns et al. | 364/478 |
| 5,031,060 | 7/1991 | Ashby | 360/98.04 |
| 5,069,597 | 12/1991 | Doctor | 414/797.9 |

FOREIGN PATENT DOCUMENTS

| | | | |
|---|---|---|---|
| 87416 | 4/1988 | Japan | 414/797.9 |
| 230999 | 5/1944 | Sweden | 414/797.9 |
| 1140863 | 2/1985 | U.S.S.R. | 414/907 |

*Primary Examiner*—Michael S. Huppert
*Assistant Examiner*—Gregory A. Morse
*Attorney, Agent, or Firm*—Schneck & McHugh

[57] ABSTRACT

An apparatus and system for sequentially releasing floppy disks includes a hopper for holding the stack of the disks and a mechanism for sliding the lowermost disk in the stack from beneath the remainder of the stack. A plunger device enters the area between the lowermost disk and a next lowest disk to provide some separation at an area of concern, while leaving sufficient contact between the two disks to ensure that the stack and a load member atop the stack provide the gravitational force necessary to properly position the lowermost disk for release. In a preferred embodiment, the stacks of disks are floppy disks and the plunger device is aligned to provide separation at write-protect notches of the disk. The plunger device may be a fluid-actuated device.

19 Claims, 5 Drawing Sheets

RECIPROCATING MEMBER FOR DISPENSING FLAT ARTICLES

DESCRIPTION

1. Technical Field

The present invention relates generally to apparatus and methods for automated handling and dispensing of flat articles, such as computer disks, and more particularly to dispensing individual flat articles.

2. Background Art

Often in the purchase of computer software such as a word processing program, the software is contained on a multi7disk set of prerecorded magnetic disks. The magnetic disks are commonly referred to as floppy disks and are contained within protective jackets. Standard sizes are 5.25 inches and 3.5 inches.

Typically, any duplicator prerecords the information on the disks, with each separate portion in a multi7disk set being mass produced separately. For example, in a six-disk set, the six portions are separately recorded on the different disks. As a result, there are six stacks of disks.

The disks must then be collated to form complete sets for packaging and sale. The conventional method of collating is to hand sort the disks. This method is labor intensive and is prone to human error. Regardless of the method of collation, any time there is an extra disk or a short set after the completion of the collating, proper quality control techniques require additional labor in determining whether an error has been made.

What is needed is a reliable automated device for the handling of computer disks. U.S. Pat. No. 4,910,675 to Burns et al., U.S. pat. No. 4,813,838 to Santeusanio, U.S. Pat. No. 4,571,645 to Johnson et al. and U.S. Pat. No. 4,494,900 to Johnson et al. teach devices for automated handling in disk production and recording. While each of the devices offers advantages over hand sorting and delivering the workpieces, the devices may be susceptible to jamming. This is particularly true for process steps, such as collating, in which the jacketed floppy disks have been inserted into a sleeve. A 5.25" floppy disk is typically inserted into a sleeve, such as one made of a spunbonded olefin sold by Dupont under the trade name TYVEK. The sleeves include a number of edges and folds that significantly increase the susceptibility of an automated device to jams. For example, a 5.25" disk includes a write-protect notch that may have a burr caused during formation of the notch. Sliding a first sleeved disk against a second sleeved disk may cause a burr on the first disk to catch the sleeve of the second disk and wrinkle the sleeve. The wrinkled sleeve will change the dimensions of the second disk and this change may cause problems in subsequent handling of the second disk.

It is an object of the present invention to provide an apparatus and method for reliable automated handling of computer disks, particularly disks that have been inserted into a sleeve or envelope.

SUMMARY OF THE INVENTION

The above object has been met by an apparatus and method for sequentially releasing flat articles, particularly computer disks from a disk stack, wherein the stack above a disk to be released is partially supported at areas designed to reduce the likelihood of jamming, but the stack is not fully supported so that the gravitational force provided by the stack may be used to urge the releasing disk into proper alignment.

In one embodiment, a reciprocating plunger is inserted slightly above a lowermost floppy disk to provide a slight separation between the lowermost disk and a next lowest disk at an edge having a write-protect notch. The insertion may be momentary, merely allowing the write-protect notch of the releasing disk to slide past any edges of a containment sleeve of the next lowest disk. As a result, any burrs on the write-protect notch will not cause wrinkling of the sleeve. By preventing wrinkling of the sleeve, the dimensions of the sleeved and jacketed floppy disks remain as designed and the apparatus is less susceptible to jamming.

A releasing disk is caused to slide along the underside of the next lowest disk. This sliding motion is in a direction that ensures that the jacketed disk remains properly seated within its sleeve. As compared to a downward release of the lowermost disk, the sliding motion achieves greater reliability in maintaining the proper seating of the disk within the sleeve.

The reciprocating plunger preferably is a fluid-actuated piston device configured to easily slide into the appropriate position of the stack. As noted above, the insertion may be momentary. However, this is not criti7cal, since the partial support of the stack can be maintained throughout the release of the lowermost disk. As a further alternative, the piston device may be replaced with a swinging member that pivots into place by movement about a vertical axis.

An advantage of the present invention is that the apparatus and method automate the handling of floppy disks that are contained within a jacket and that are seated within a sleeve. While the present invention is most suited for the jacketed and sleeved disk, the apparatus and method may be used in the handling of other computer disks. For example, partial support may be provided at a sliding metallic door of a conventional 3.5" computer disk to prevent scratching of the sliding door as one disk is caused to move along the underside of another.

Another advantage of the present invention is that collation of disks for a multi7disk program is facilitated. A stack of each disk of the program can be contained within a hopper that is aligned with other hoppers for the remaining stacks. The resulting apparatus thereby eliminates the need of hand collating a multi7disk set.

BEST MODE FOR CARRYING OUT THE INVENTION

Figure 1:
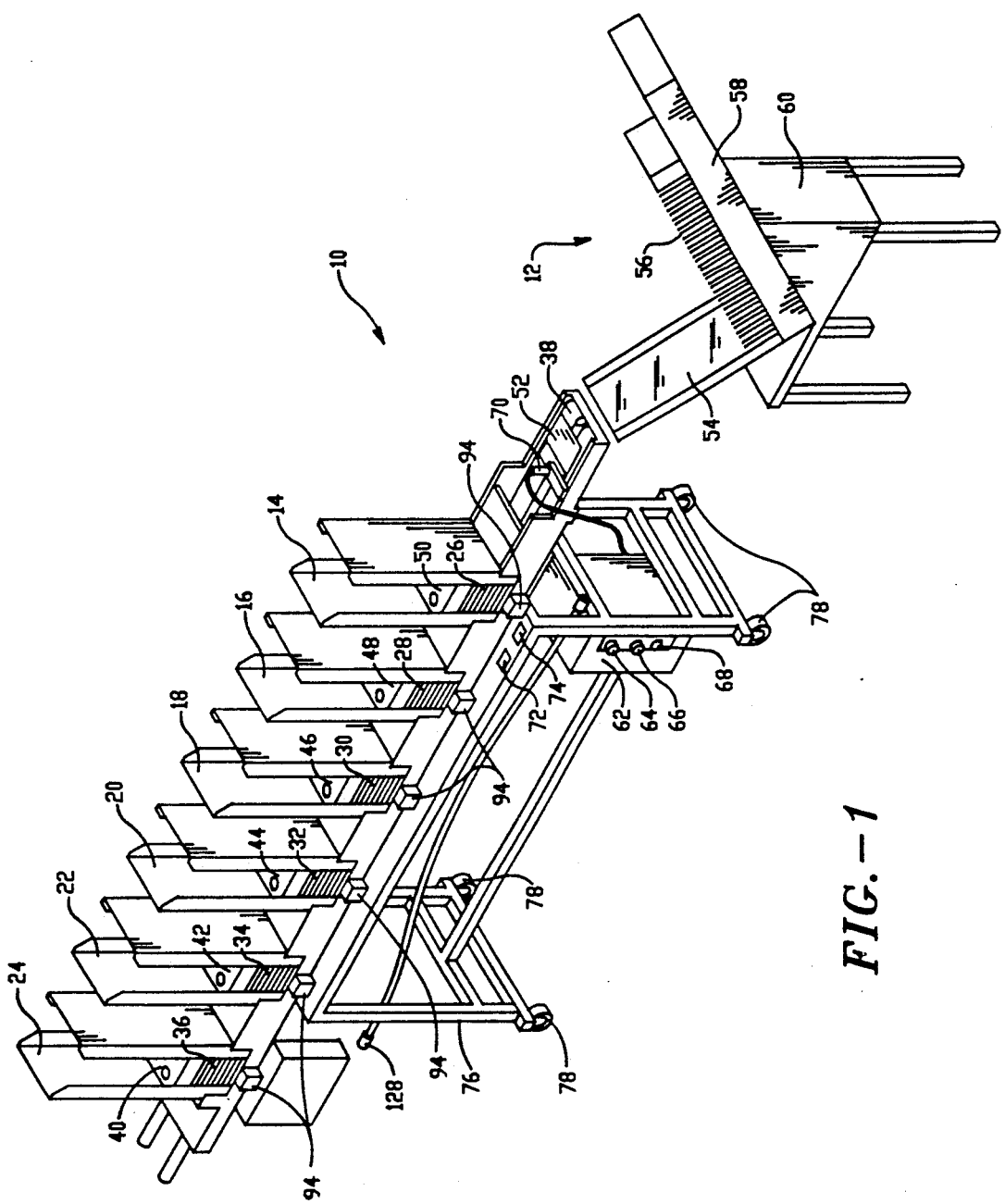
FIG. 1 is a perspective view of a collation device and a stacker member, with the collation device including plungers in accordance with the present invention.

With reference to FIG. 1, a collating apparatus 10 is shown with a disk stacker 12. The collating apparatus includes six hoppers 14, 16, 18, 20, 22 and 24. Each hopper contains a stack 26, 28, 30, 32, 34 and 36 of floppy disks. All of the disks within a particular stack are identical, but information on the disks of stack 26 is different than information contained on disks within the other stacks. For example, the stacks 26–36 may be the six different disks of a word processing program.

As will be explained more fully below, the first disk of a complete set is contained within the first hopper 14, while the last disk is contained within the sixth hopper 24. For sets less than six, no special setup is necessary other than to set the appropriate number at a disk counter which will be described below. Rather, the appropriate number of hoppers is left empty. If instead the set is greater than six, a second collating apparatus, not shown, can be connected to the one shown in FIG. 1. An endless conveyor belt 38 carries the individual floppy disks to the stacker 12. The apparatus is structured such that the conveyor belt of a second collating apparatus delivers its disks to the conveyor belt 38 of the collating apparatus 10. That is, the apparatus is a modular unit.

Atop each disk stack 26–36 is a load member 40, 42, 44, 46, 48 and 50. The load member provides compression to ensure proper positioning of the lowermost disk in a stack. The lowermost disk is held flat during the release process. The release process is one that utilizes a pusher plate, not shown, to simultaneously slide each lowermost disk in the stacks 26–36 forwardly from beneath the stack. The six sliding disks reach openings that simultaneously drop the six disks onto the conveyor belt 38. The six disks then move uniformly toward the stacker 12.

FIG. 1 shows a single disk 52 immediately before the disk is gravity fed to the stacker. A disk 52 from the conveyor belt slides along a tray 54 and is inserted below a collated stack 56 of disks. A user may then remove the disks in a six-disk set process for packaging and sale of the collated sets.

A hopper 58 on the stacker 12 collects the collated stack 56. A stand 60 properly aligns the tray 54 and the hopper 58 for collection of disks from the conveyor belt. While not shown, a piston device is used to provide room for each succeeding disk as it moves to the area below the collated stack 56. As an alternative to the stacker 12, a device may be used that positions each succeeding disk atop the stack, rather than beneath the stack. In this case, the order of the stacks 26–36 would be reversed within the hoppers 14–24, so that the first disk in the set would be in hopper 24.

Operation of the collating apparatus 10 is electroni7 cally controlled at a housing 62. The housing includes controls 64, 66 and 68 that may include a power switch, an on-off control for a disk count, a start button, and/or a potentiometer for controlling the speed of the conveyor belt 38. A disk count is achieved by use of an infrared detector system. The system includes a light source 70 that directs a beam downwardly through a split in the conveyor belt 38. A photodetector, not shown, on the opposite side of the conveyor belt is aligned to receive the light energy from the source 70. Interruption of the path from the source 70 to the photodetector by a disk 52 triggers a count of the disk. The above-described infrared detector system is not critical to proper operation of the collating apparatus. Light detection outside of the infrared bandwidth is possible and, in fact, sound waves may be utilized in the detector system. Moreover, rather than a system in which wave energy is directed from a source to a receptor, a reflected or diffused detector system may be used.

The apparatus 10 includes two counters 72 and 74. The first counter 72 is selectively adjusted for the number of disk stacks 26–36. As noted above, the number may be less than the six shown in FIG. 1 or can be greater if a second collating apparatus is connected to the illustrated master collating apparatus. The second counter 74 is set for the number of desired sets. For example, where thirty-six sets of six disks are desired the counters 72 and 74 are respectively set at "6" and "36". As each disk interrupts the light path from the source 70, the number indicated by the first counter 72 is decreased by one. Upon reaching zero, the second counter 74 is decreased by one. Preferably, the count is in the opposite direction, so that the movement of a disk 52 past a detection area increments the first counter upwardly by one unit. When the first counter reaches the preset number of disks in a set, the first counter returns to zero and the second counter is incrementally adjusted upwardly. Only upon the counting of all six disks within a set can the apparatus 10 be triggered to release more disks onto the conveyor belt 38. Thus, if for some reason all six disks were not released for a particular set, operation of the apparatus will cease until an operator has corrected any problem.

The collating apparatus 10 includes a support frame 76. Optionally, wheels 78 are included to facilitate connection and disconnection of one collating apparatus 10 to a second collating apparatus.

The apparatus 10 may be used to collate any sized floppy disk. The hoppers 14–24 are dimensioned to hold stacks of 5.25" disks. Smaller disks, such as 3.5" members, may be used with the hoppers by providing an insert, not shown, that reduces the area for insertion of a disk. However, it is preferred to use different collating machines for different size floppy disks.

Figure 2:
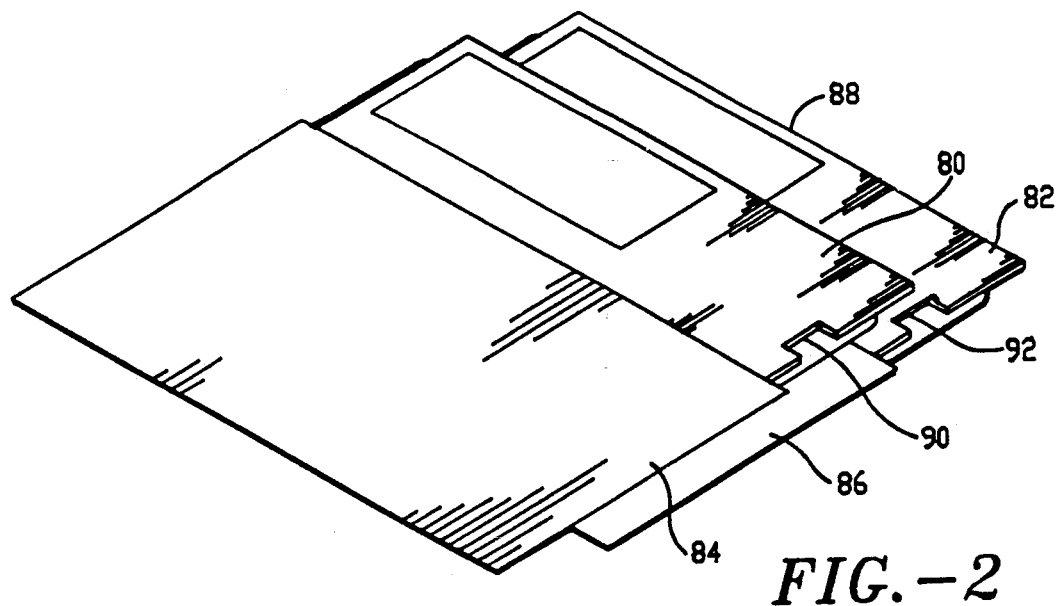
FIG. 2 is a perspective view of two 5.25" disks that may be used with the apparatus of FIG. 1.
Figure 3:
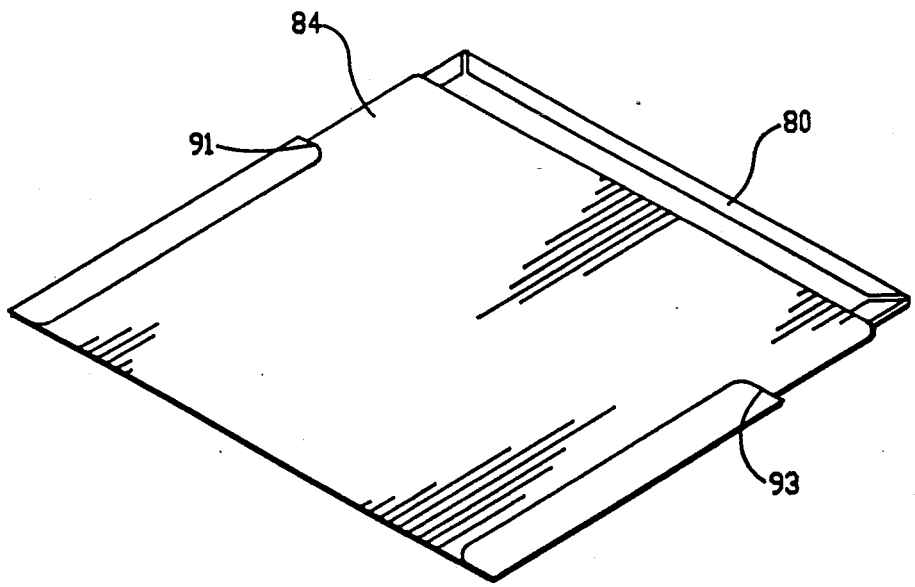
FIG. 3 is a perspective rear view of a disk of FIG. 2.

Referring now to FIGS. 1–3, the collating apparatus 10 may be used with floppy disks 80 and 82 that are contained within a sleeve 84 and 86. Sleeves 84 and 86 are conventionally used during storage of the disks. While there are advantages to use of the sleeve, the sleeve greatly complicates automated handling of disks. Both the material used and the method of forming the sleeve create difficulties.

One potential problem in the automated handling of sleeved disks 80 and 82 is that the disks may become unseated from the sleeves 84 and 86. The disks are merely slidably fitted the sleeves. The collating apparatus 10 is designed to push a lower disk 82 at a top edge 88, so that movement of the lowermost disk in a stack 26–36 is in a direction that urges proper seating of the disk within its sleeve. The lowermost disk therefore slides along the underside of the next lowest disk in the stack.

Another problem is a result of formation of write-protect notches 90 and 92 that are punched into jackets that protect the magnetic disks. The write-protect notch 92 of the disk 82 is shown as including a burr on an upper edge of the notch. This burr has the potential of wrinkling the sleeve 84 of the adjacent disk 80 as the lower disk is slid along the underside of the upper disk. Specifically, the burr can catch on a lip 91 and 93 on the backside of the upper sleeve 84. Because of the angular geometry of the write-protect notch, the notch itself may catch a lip of the upper sleeve. Any wrinkling of a sleeve will increase the chances of a jam occurring, since a wrinkle will change the thickness of the sleeved disk. Any change of thickness will adversely affect operation because the openings for travel of the releasing disk must be made with tight manufacturing tolerances in order to ensure that only the lowermost disk is pushed from beneath the remainder of the stack.

Figure 4:
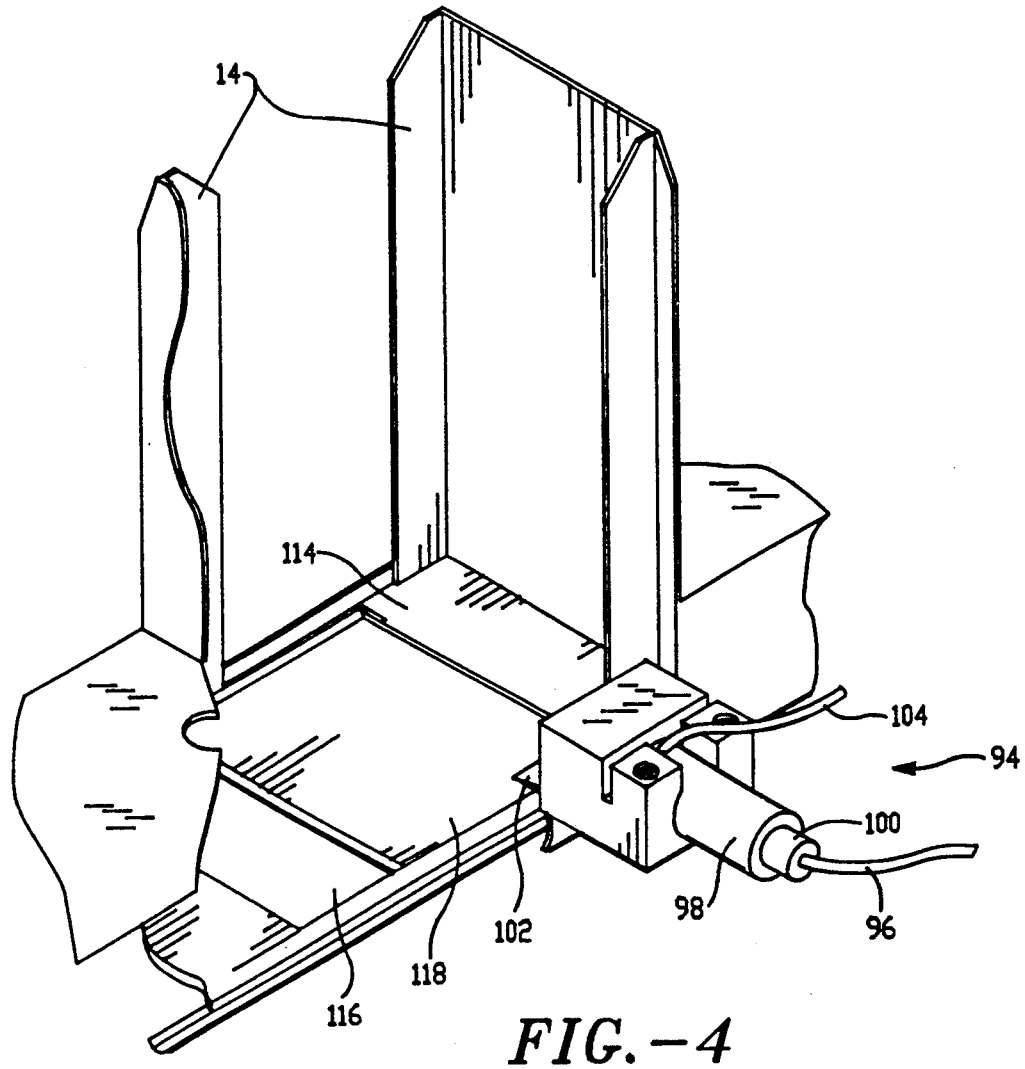
FIG. 4 is a perspective view of a plunger device positioned on the apparatus of FIG. 1 in accordance with the present invention.
Figure 5:
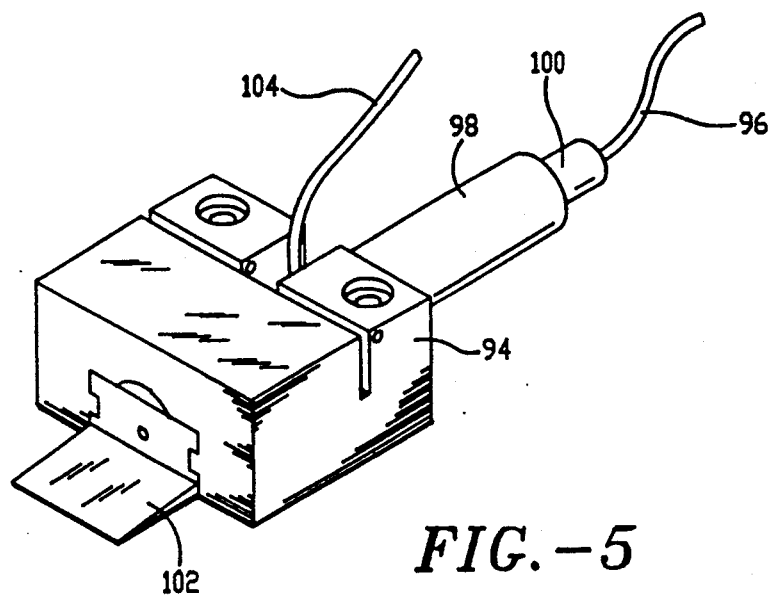
FIG. 5 is a perspective view of the plunger device of FIG. 4.
Figure 6:
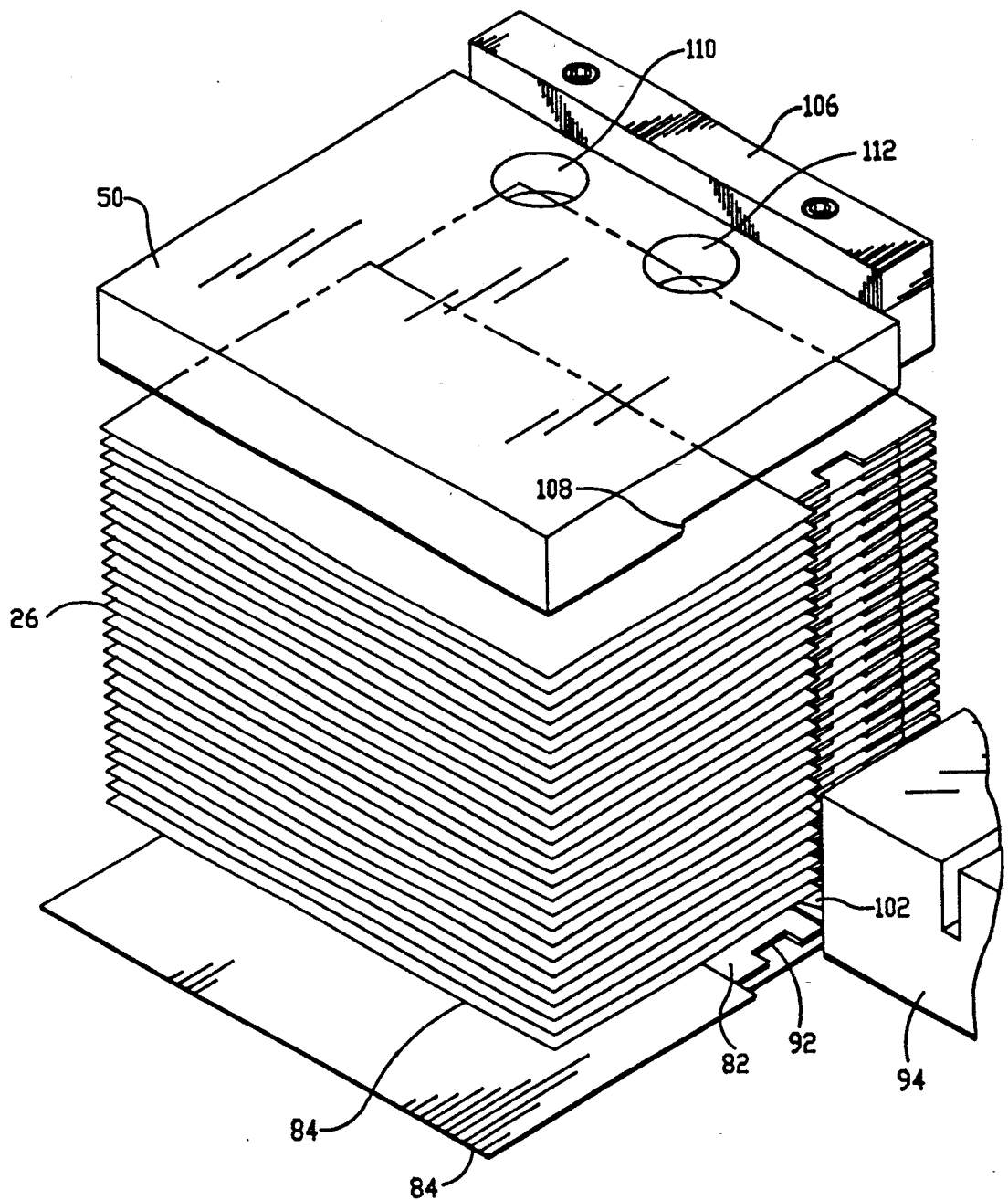
FIG. 6 is a perspective view of a stack of disks with a load member and a plunger device of FIG. 1.

Referring now to FIGS. 4, 5 and 6, wrinkling of a sleeve by a write-protect notch or a burr on a write-protect notch is prevented by use of a plunger device 94. The plunger device is operatively associated with the hopper 14 that holds one of the stacks 26 of floppy disks. An air hose 96 is connected to a cylinder 98 at a fitting 100. The injection of air through the hose 96 causes movement of an insert member 102, which has a thickness that increases with approach to the housing of the plunger device 94. The injection of air through a second hose 104 causes the insert member 102 to retract completely within the plunger housing 94.

In operation, the plunger device 94 has an extracted position shown in FIGS. 5 and 6 in which the insert member 102 extends outwardly from the plunger device and into the stack 26 of disks. The plunger device is positioned relative to the stack so that the insert member 102 allows free passage of the write-protect notch 92 of the lowermost disk 82 past the sleeve 84 of the next lowest disk. The entrance of the insert member 102 may be short, allowing the write-protect notch 92 to travel past the area of concern with regard to wrinkling of the sleeve 84. Alternatively, the insert member may be held in its extracted position throughout the sliding of the lowermost disk from below the stack 26. Following a release of the lowermost disk, the insert member 102 is retracted into the body of the plunger device 94, so as to permit the next lowest disk to move to a position in which it can be pushed in the same manner from beneath the stack 26.

An important concern in ensuring reliable operation of the collating apparatus is the proper positioning of the upper edge of a disk 82 to be released. The lowermost disk 82 is pushed from beneath the stack 26 and, as will be explained more fully below, unless the upper edge is maintained in the proper position the pushing mechanism will slide beneath the disk and cause a jam. The load member 50 is a transparent member having a weight 106 connected at a side associated with the top edge of the disks in the stack 26. The mass of the weight 106 ensures an uninterrupted contact of the disks at their top edges. The gravitational force of the weight 106, the load member 50 and the disk stack 26 urges the lowermost disk 82 to maintain proper positioning throughout the sliding motion. In order to allow gravitational force to play such a role, the insert member 102 is preferably prevented from passing completely through the spacing between the lowest disk and the next lowest disk. The load member 50 includes a small recess 108 that allows a small amount of stack flexing to occur in response to the entrance of the insert member 102 into the stack. Moreover, the recess 108 is positioned to receive the insert member 102 when the entire stack 26 has been released.

The housing of the plunger device 94 may be made of aluminum, but this is not critical. The insert member 102 should be made of a material which will not cause damage to the sleeved disks of the stack 26. For example, the insert member may be made of nylon. The leading edge should not be so sharp as to engage individual fibers of a TYVEK sleeve. A sharp leading edge could cause some wrinkling of a sleeve. The width of the insert member may be approximately 1". The length of the portion of the insert member that varies in thickness for entrance into the stack may be approximately 0.5". While these dimensions are not critical, entrance of the insert member into the stack of 5.25" disks preferably does not exceed 2".

The load member 50 of FIG. 6 includes a pair of openings 110 and 112. A user may easily grasp the load member by inserting fingers into the openings. While not shown, the openings may be increased in cross sectional area in the descending direction, facilitating placement and removal of the load member 50.

As previously described, the lowermost disk within a hopper 14 is pushed, causing the disk to slide from beneath the remainder of the stack. Referring now to FIG. 4, a push plate 114 is shown as having partially advanced from a normal rest position. If the hopper 14 included a disk, the disk would have advanced toward a pass-through opening 116 in a stationary plate 118. In operation, the push plate 114 is pneumatically driven to periodically slide a lowermost disk along the upper surface of the stationary plate 118. The released disk travels through a gap in the hopper 14. Preferably, this gap includes cutouts at opposed ends to accommodate any dog-eared corners on a disk sleeve, thereby reducing the susceptibility of the apparatus to jams. Following passage to the gap, the releasing disk is moved over the pass-through opening 116. The disk then drops onto the conveyor belt of the apparatus.

There is a hierarchy of openings for the release of a disk. That is, successive openings are made progressively larger in order to eliminate disk hangup. A disk-receiving opening in the slidable push plate 114 is made larger than the hopper. In turn, the pass-through opening 116 in the stationary plate 118 is larger than the disk-receiving opening of the push plate. Finally, the endless conveyor belt is larger than the pass-through opening 116.

Preferably, a stream of air is injected between the displaceable push plate 114 and the stationary plate 118. The injected air provides an air bearing, reducing friction between movable parts. This promotes durability and reduces wear and prevents dust and other particles from building up in areas which would increase push plate friction.

Figure 7:
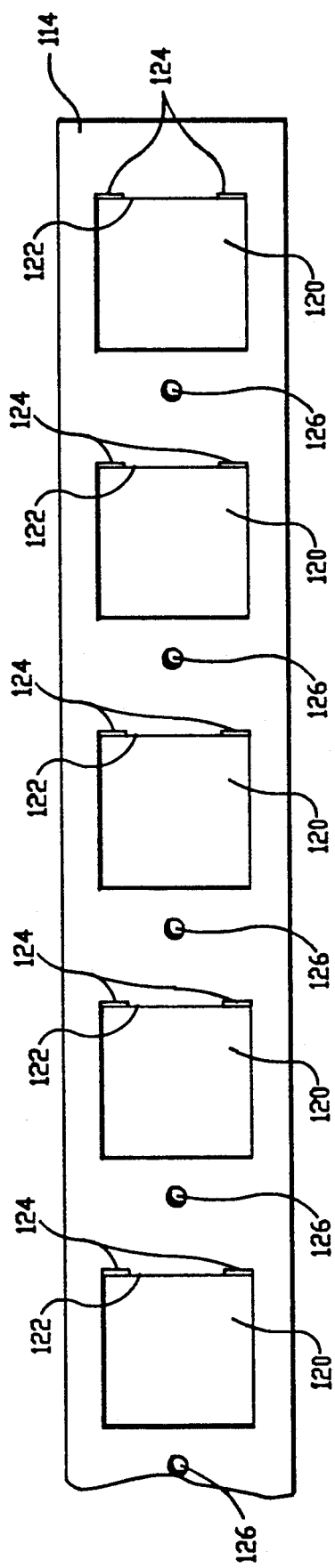
FIG. 7 is a top view of a push plate for sliding lowermost disks from the stacks of FIG. 1.
Figure 8:
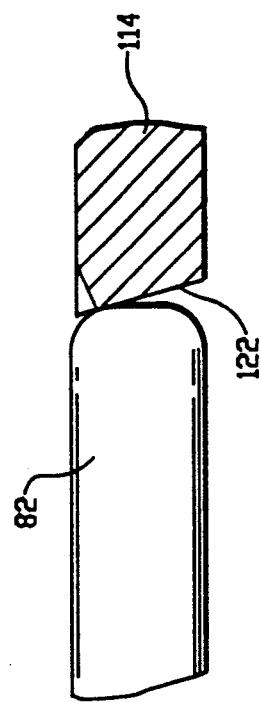
FIG. 8 is a side sectional view of the push plate of FIG. 7 in contact with a computer disk.

Referring to FIGS. 4, 7 and 8, the push plate 114 includes a separate disk-receiving opening 120 for each hopper. In a rest position, the openings 120 are directly below the hoppers and a single disk is gravity fed into an opening from an associated hopper. When the push plate 114 is moved forwardly, each disk moves forwardly along the stationary plate 118 for deposit on the endless conveyor belt. One edge 122 of each opening 120 is at a 15° angle relative to a disk 82 to be released. The angling of the pushing edge 122 functions to trap the disk 82. This reduces the possibility of the disk rising above the push plate 114 to jam the apparatus.

In comparison to the angling of the pushing edge 122 that is shown in FIG. 8, the opposite ends 124 of the edge 122 are chamfered, as best seen in FIG. 7. The chamfer is in the opposite direction of the central angling of the pushing edge 122. The chamfered ends 124 allow smooth passage of the edge 122 past the folded-over portions on the backside of a disk sleeve.

A last feature of the pusher plate 114 of FIGS. 4 and 7 is circular cuts 126 that are aligned with the pass-through openings 116 of the stationary plate 118 when the push plate is in a rest position. The aligned circular cuts 126 and pass-through openings 116 provide a view of the underlying conveyor belt, so that a user can determine whether any obstructions on the conveyor belt prevent the passage of disks.

As shown in FIG. 8, the push plate 114 has a thickness that is slightly less than the thickness of the disk 82. The thickness of the push plate may be 0.054" for standard 5.25" disks. The relative thicknesses prevent the push plate from reaching above the lowermost disk 82 to contact the sleeve of the next lowest disk.

In operation, the collating apparatus 10 of FIG. 1 is pneumatically driven by pressure supplied by connecting a hose 128 to an in-house air supply. The hose 128 includes at least one T-junction, not shown, which permits connection both to the apparatus 10 and to a second collating apparatus. The first counter 72 is adjusted to indicate the number of disks within a set and the second counter 74 is adjusted to indicate the number of sets to be collated.

Each stack 26-36 within the hoppers 14-24 is pressed downwardly by a load member 40-50. The load members are keyed so that they can only be inserted in a position in which the greater mass is at the side of the hopper opposite to the stacker 12. This ensures proper positioning of the lowermost disks relative to the push plate which slides the disks from the stack.

When the apparatus 10 is started, the push plate slides a single disk from each of the six hoppers 14-24. In one embodiment, pneumatic displacement of the push plate and the pneumatic operation of the six plunger devices 94 are controlled by a single solenoid. The capacity of the plunger devices is less than the capacity of the driving device for pushing the push plate. Thus, the insert members of the plunger devices enter the area between the lowermost disk and the next lowest disk prior to the initiation of displacement of the push plate.

Merely for purposes of illustration, the plunger devices 94 are shown on the right side of the collating apparatus 10. This is the side opposite to write-protect notches in the jackets of the disk stacks 26-36. In use, the plunger devices will be on the opposite side of the collating apparatus, functioning to prevent a burr on a write-protect notch or the write-protect notch itself from wrinkling a sleeve on an adjacent disk. The plunger devices 94 can also be used in collating disks other than 5.25" disks. For example, the devices may be used to provide some separation between adjacent 3.5" disks to prevent scratching of sliding metallic doors on the disks.

The push plate simultaneously deposits six computer disks onto the endless conveyor belt 38. The conveyor belt moves the disks toward the stacker 12. Each disk slides down the tray 54 of the stacker and is inserted beneath the collated stack 56.

As each disk 52 moves past the energy source 70, the energy path is interrupted and the first counter 72 is increased by one increment. When the count on the counter 72 reaches the preset number of disks within a set, the readout on the second counter 74 is increased by one and the readout on the first counter 72 is returned to "0". The apparatus will continue to operate until the readout on the second counter 74 reaches the preset number of sets to be collated.

We claim:

1. An apparatus for sequentially releasing disks, such as computer disks, from a stack comprising,
   support means for holding a stack of disks in a condition in which disks atop a lowest disk exert gravitational force on said lowest disk,
   singularization means for sliding said lowest disk along an underside of a next lowest disk in said stack, said singularization means including a pusher plate having a disk-receiving opening positioned to receive said lowest disk and to contact an edge thereof, said pusher plate having a height not exceeding the height of said lowest disk, thereby allowing said pusher plate to pass beneath said next lowest disk, said singularization means disposed such that said sliding of said lowest disk is in the direction generally parallel to an edge of said lowest disk,
   reciprocating means for partially supporting said next lowest disk during said sliding of said lowest disk, said reciprocating means having a retracted position and having an extracted position in which said next lowest disk is partially supported while maintaining a portion of said gravitational force of said disks on said lowest disk, said lowest disk thereby being pressed downwardly during said sliding, said reciprocating means being mounted in fixed relation to said support means for motion independent of said pusher plate,
   a first actuation means for selectively triggering motion of said reciprocating means between said retracted position and said extracted position, and
   second actuation means for sliding said pusher plate while said reciprocating means is selectively fixed in position relative to said support means.

2. The apparatus of claim 1 wherein said means for holding said stack of disks is a hopper positioned to secure said stack in a generally vertical orientation.

3. The apparatus of claim 1 wherein said reciprocating means includes a plunger disposed to enter between said lowest and next lowest disks at corresponding edges of said lowest and next lowest disks, said plunger extending under only a minor portion of said underside of said next lowest disk when said reciprocating means is in said extracted position.

4. The apparatus of claim 3 wherein said reciprocating means includes a fluid-actuated piston, said plunger coupled to said fluid-actuated piston.

5. The apparatus of claim 3 wherein said plunger is spaced apart from said lowest and next lowest disks when said reciprocating means is in said retracted position.

6. The apparatus of claim 2 wherein said hopper is configured to secure jacketed floppy disks, each having a sleeve, said reciprocating means entering said lowest and next lowest disks at a single edge of said disks.

7. The apparatus of claim 6 further comprising a load member atop said stack, said load member having a lower surface, said lower surface having an area that is recessed, said recessed area having a boundary that coincides with a portion of a side of said load member, said boundary and said side further being disposed on the same side as said single edge of said next lowest disk to permit upward movement of said single edge upon insertion of said reciprocating means.

8. The apparatus of claim 3 wherein said plunger is less than two inches in length.

9. An apparatus for sequentially releasing floppy disks having a write-protect notch at a first edge of a jacket, each floppy disk contained within a sleeve, comprising,
  hopper means for holding a stack of said floppy disks with generally aligned write-protect notches, said floppy disks being spaced apart by said sleeves,
  pusher means for contacting a lowermost disk in said stack aligned with said hopper means,
  means for displacing said pusher means to slide said lowermost floppy disk contacted thereby along a major side of said lowermost floppy disk, thereby sliding said lowermost floppy disk from said hopper means, and
  plunger means for selectively entering said hopper means slightly above said lowermost floppy disk, said plunger means disposed to enter at a side of said hopper means associated with said first edge of said floppy disk having said write-protect notch,
  said means for displacing positioned to have a direction of travel generally perpendicular to the direction from which said plunger means enters said side of said hopper means.

10. The apparatus of claim 9 wherein said plunger means is a fluid-actuated member, said plunger means being spaced apart from said floppy disks when in a retracted position, said plunger means having an extracted position in which said plunger means partially extends across said lowermost floppy disk.

11. The apparatus of claim 9 wherein said pusher means includes a plate having an opening to receive said lowermost disk, said means for displacing providing linear displacement of said plate to remove said lowermost disk from said stack of floppy disks.

12. The apparatus of claim 9 wherein said means for displacing and said plunger means are each fluid-actuated members having a single source of fluid.

13. The apparatus of claim 9 further comprising a plurality of hopper means and a plurality of plunger means, each of said hopper means being operatively associated with said pusher means to allow collation of floppy disks released from said plurality of hopper means.

14. The apparatus of claim 9 wherein said lowermost disk is aligned with a release opening, said pusher means being displaceable to pass said lowermost disk through said release opening.

15. The apparatus of claim 9 wherein said plunger means extends less than two inches into said hopper means.

16. A method of singularizing computer disks comprising,
  stacking the computer disks in a condition such that a stack exerts gravitational force on a lowest disk,
  aligning a pusher plate having a disk-receiving opening with said stack of computer disks such that the lowest disk is received therein,
  after said step of aligning said pusher plate, inserting a reciprocating member between the lowest disk and a next lowest disk such that disks at a level directly above the lowest disk are partially supported by said reciprocating member while leaving a portion of the gravitational force still pressing the lowest disk,
  following said step of inserting said reciprocating member, sliding the lowest disk along an underside of the next lowest disk, said sliding being opposed by friction of said next lowest disk against the lowest disk, said sliding being in a direction that is generally perpendicular to the direction taken by said reciprocating member during said step of inserting said member, and
  repositioning the next lowest disk to a location previously maintained by the lowest disk.

17. The method of claim 16 wherein the step of sliding the lowest disk includes pushing the lowest disk through a release opening.

18. The method of claim 16 further comprising repeating the step of inserting said reciprocating member and the step of sliding a disk following the step of repositioning the next lowest disk.

19. The method of claim 16 wherein inserting the reciprocating member includes a step of actuating a solenoid to forwardly slide said reciprocating member from a position wherein said member is not inserted between said disks.

* * * * *